United States Patent
Park

(10) Patent No.: US 10,415,683 B2
(45) Date of Patent: Sep. 17, 2019

(54) SPEED REDUCER FOR VEHICLE

(71) Applicant: MANDO CORPORATION, Pyeongtaek-si, Gyeonggi-do (KR)

(72) Inventor: JooYeol Park, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 386 days.

(21) Appl. No.: 15/365,615

(22) Filed: Nov. 30, 2016

(65) Prior Publication Data
US 2017/0175870 A1 Jun. 22, 2017

(30) Foreign Application Priority Data
Dec. 21, 2015 (KR) .................. 10-2015-0182703

(51) Int. Cl.
| | |
|---|---|
| *F16H 55/06* | (2006.01) |
| *F16H 1/16* | (2006.01) |
| *F16H 55/22* | (2006.01) |
| *F16H 57/04* | (2010.01) |
| *B62D 5/04* | (2006.01) |
| *F16H 55/24* | (2006.01) |

(52) U.S. Cl.
CPC .............. *F16H 55/06* (2013.01); *F16H 1/16* (2013.01); *F16H 55/22* (2013.01); *F16H 57/0412* (2013.01); *F16H 57/0498* (2013.01); *B62D 5/0409* (2013.01); *F16H 55/24* (2013.01)

(58) Field of Classification Search
CPC .. F16H 57/0417; F16H 55/06; F16H 57/0498; F16H 55/12
See application file for complete search history.

(56) References Cited

U.S. PATENT DOCUMENTS

| | | | |
|---|---|---|---|
| 2,675,098 A | * | 4/1954 | Cole .................. F16H 57/0406 184/102 |
| 3,591,909 A | * | 7/1971 | Bebbington, Jr. .......................... B62D 55/0963 29/893.37 |
| 3,719,103 A | | 3/1973 | Streander |

(Continued)

FOREIGN PATENT DOCUMENTS

JP 2006-194296 A 7/2006

OTHER PUBLICATIONS

Chinese Office Action dated Sep. 12, 2018 issued in Chinese Patent Application No. 201611191409.1.

*Primary Examiner* — Terence Boes
(74) *Attorney, Agent, or Firm* — Morgan, Lewis & Bockius LLP

(57) ABSTRACT

The present invention relates to a speed reducer for a vehicle. The speed reducer of an electric power steering system includes a worm and a worm wheel, wherein the worm wheel includes: a boss having an empty space into which a steering shaft is inserted; a gear part integrally formed with the outer circumferential surface of the boss and having crests and roots formed on the outer circumferential surface thereof so as to be engaged with the worm; and a heat conduction member provided on the side of the boss and the gear part to support the roots and the boss to conduct, to the boss, frictional heat generated from the gear part. Accordingly, the speed reducer releases frictional heat from the worm wheel to the boss to prevent wear and noise caused by expansion of the worm wheel.

15 Claims, 11 Drawing Sheets

(56) References Cited

U.S. PATENT DOCUMENTS

| | | | | |
|---|---|---|---|---|
| 5,906,135 | A * | 5/1999 | Prater | B23P 11/005 |
| | | | | 29/521 |
| 7,793,753 | B2 * | 9/2010 | Bernhard | F16H 55/12 |
| | | | | 180/444 |
| 8,096,204 | B2 * | 1/2012 | Imagaki | B62D 5/0409 |
| | | | | 74/388 PS |
| 2002/0056588 | A1 * | 5/2002 | Kuze | B62D 5/0409 |
| | | | | 180/444 |
| 2002/0112555 | A1 * | 8/2002 | Chikaraishi | B62D 5/0409 |
| | | | | 74/388 PS |
| 2004/0221669 | A1 * | 11/2004 | Shimizu | B62D 5/0409 |
| | | | | 74/388 PS |
| 2016/0017976 | A1 * | 1/2016 | Iijima | F16H 55/06 |
| | | | | 74/446 |

* cited by examiner

SPEED REDUCER FOR VEHICLE

CROSS REFERENCE TO RELATED APPLICATION

This application claims priority from Korean Patent Application No. 10-2015-0182703, filed on Dec. 21, 2015, which is hereby incorporated by reference for all purposes as if fully set forth herein.

BACKGROUND OF THE INVENTION

1. Field of the Invention

The present invention relates to a speed reducer for a vehicle and, more specifically, to a speed reducer for a vehicle that: decreases the temperature of a worm wheel by conducting, to a boss, frictional heat generated when the worm wheel is rotated by the rotational force of a worm shaft caused by driving a motor, thereby preventing expansion of the worm wheel and enabling a worm and the worm wheel to be normally engaged with each other to prevent power loss and to stably provide a steering assist force for a driver; and transfers the frictional heat between the worm and the worm wheel to the boss to decrease the temperature of the worm wheel, thereby enhancing the durability of the worm wheel and preventing noise to make a driver feel comfortable when transmitting a rotational force from the worm shaft to the worm wheel.

2. Description of the Prior Art

FIG. 1 is a sectional view illustrating the internal structure of a speed reducer for a vehicle in the related art.

The speed reducer has a structure in which: a worm shaft 104 made of metal, such as steel, has a worm 102 formed on the middle part thereof; worm shaft bearings 106 are mounted on opposite ends of the worn shaft 104 to support the worm shaft 104; and the worm shaft 104 and a motor shaft 108 are connected with each other such that the worm shaft 104 is rotated by driving a motor 110.

A worm wheel 114 made of, for example, a resin composite is provided at one side of the worm 102 as a reduction gear so as to be engaged with the worm 102 formed on the middle part of the worm shaft 104. The worm wheel 114 is mounted on a steering shaft 112 that transmits the rotational force of a steering wheel (not illustrated) operated by a driver such that the rotational force of the worm shaft 104 generated by driving the motor 110 is transmitted to the steering shaft 112. The worm wheel 114 and the worm shaft 104, which are engaged with each other in a worm gear manner, are mounted within a housing 116 for protection from the outside.

An electronic control unit (not illustrated) provided in the vehicle controls the driving of the motor 110 according to the vehicle's driving conditions, and the rotational force of the worm shaft 104 generated by driving the motor 110 is added to the rotational force of the steering wheel operated by the driver and is transmitted to the steering shaft 112, thereby making the driver's steering smooth and stable.

Herein, the worm wheel of the speed reducer serves to reduce the RPM of the motor and to transmit the same to the steering shaft, and the gear made of a resin composite may be paired with the gear made of metal, as described above.

However, the speed reducer for a vehicle in the related art has a problem in that the worm wheel is rotated by the rotational force of the worm shaft generated by driving the motor so that the temperatures of the worm shaft and the worm wheel may increase due to the continuous friction therebetween and, in particular, the worm wheel formed of a resin composite (such as plastic, etc.) expands on account of the frictional heat so that the worm cannot be normally engaged with the worm shaft and power loss may be caused, whereby a steering assist force cannot be stably provided for a driver.

In addition, when the worm wheel expands due to the frictional heat between the worm shaft and the worm wheel, wear occurs between the worm shaft and the worm wheel so that durability may be weakened, and when a rotational force is transmitted from the worm shaft to the worm wheel, noise may cause a driver to feel uncomfortable.

SUMMARY OF THE INVENTION

In this background, an aspect of the present invention is to provide a speed reducer for a vehicle, the speed reducer decreasing the temperature of a worm wheel by conducting, to a boss, frictional heat that is generated when the worm wheel is rotated by the rotational force of a worm shaft caused by driving a motor, thereby preventing expansion of the worm wheel and enabling a worm and the worm wheel to be normally engaged with each other to prevent power loss and to stably provide a steering assist force for a driver.

Another aspect of the present invention is to provide a speed reducer for a vehicle, the speed reducer conducting frictional heat between a worm and a worm wheel to a boss to decrease the temperature of the worm wheel, thereby enhancing the durability of the worm wheel and preventing noise to make a driver feel comfortable when transmitting a rotational force from a worm shaft to the worm wheel.

The aspect of the present invention is not limited thereto, and other unmentioned aspects of the present invention may be clearly appreciated by those skilled in the art from the following descriptions.

The present invention provides a speed reducer for a vehicle. The speed reducer includes a worm and a worm wheel, wherein the worm wheel includes: a boss having an empty space into which a steering shaft is inserted; a gear part integrally formed with the outer circumferential surface of the boss and having crests and roots formed on the outer circumferential surface thereof so as to be engaged with the worm; and a heat conduction member provided on the side of the boss and the gear part to support the roots and the boss to conduct, to the boss, frictional heat generated from the gear part.

As described above, according to the present invention, the frictional heat generated when the worm wheel is rotated by the rotational force of the worm shaft caused by driving the motor can be conducted to the boss to decrease the temperature of the worm wheel, thereby preventing the expansion of the worm wheel and enabling the worm and the worm wheel to be normally engaged with each other to prevent power loss and to stably provide a steering assist force for a driver.

In addition, by decreasing the temperature of the worm wheel by conducting the frictional heat between the worm and the worm wheel to the boss, it is possible to enhance the durability of the worm wheel and to prevent noise when transmitting a rotational force from the worm shaft to the worm wheel, thereby making a driver feel comfortable.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
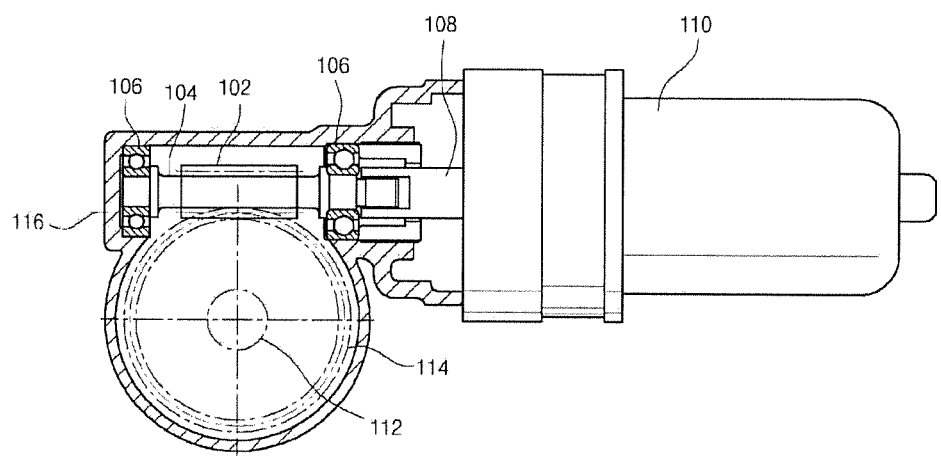
FIG. 1 is a sectional view illustrating the internal structure of a speed reducer for a vehicle in the related art.

Hereinafter, embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
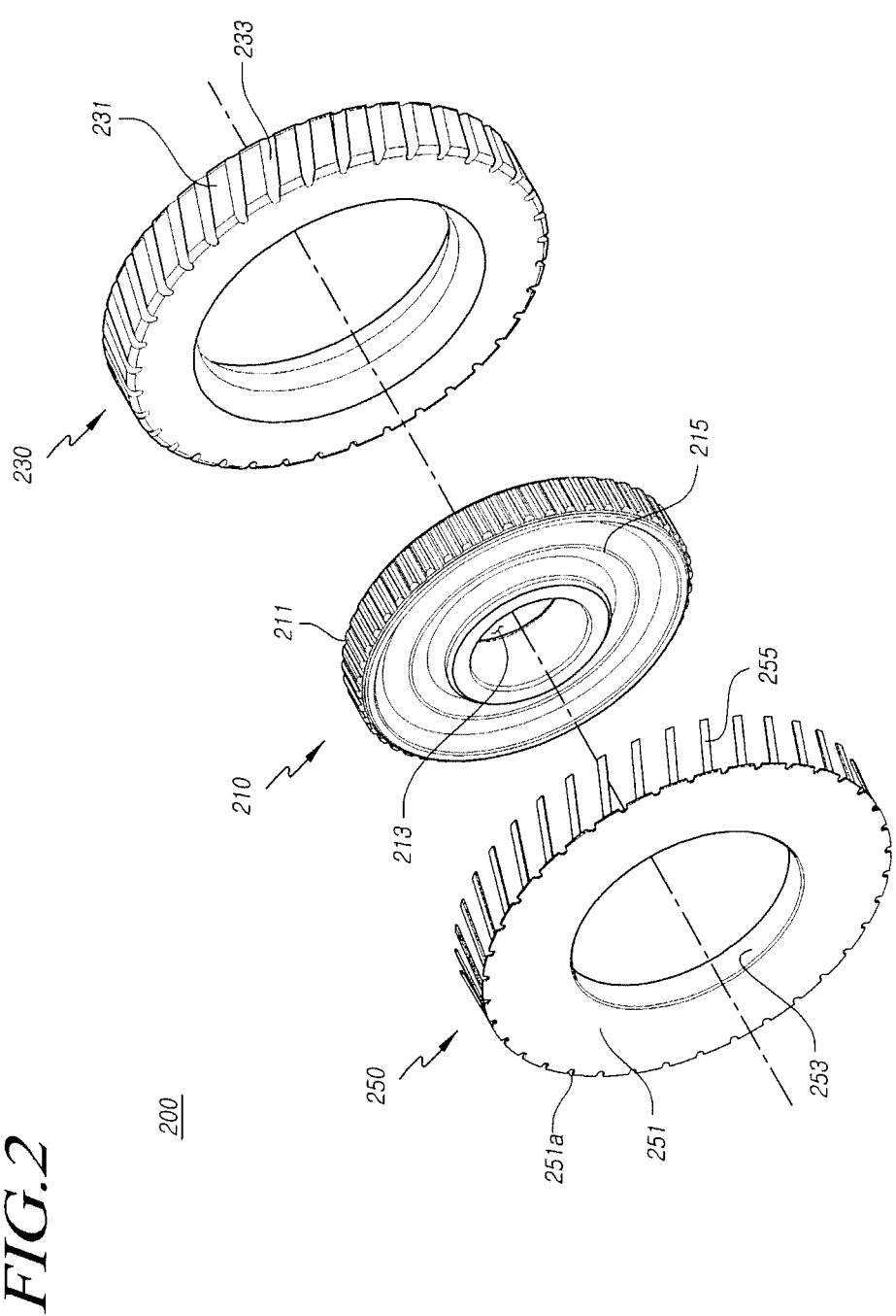
FIG. 2 is an exploded perspective view of a worm wheel of a speed reducer for a vehicle according to one embodiment of the present invention.
Figure 3:
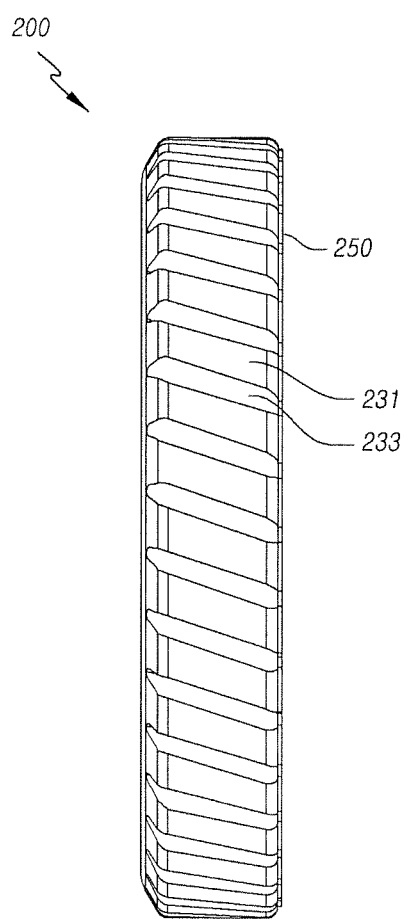
FIG. 3 is a side view of the worm wheel of the speed reducer for a vehicle according to the embodiment of the present invention.
Figure 4A:
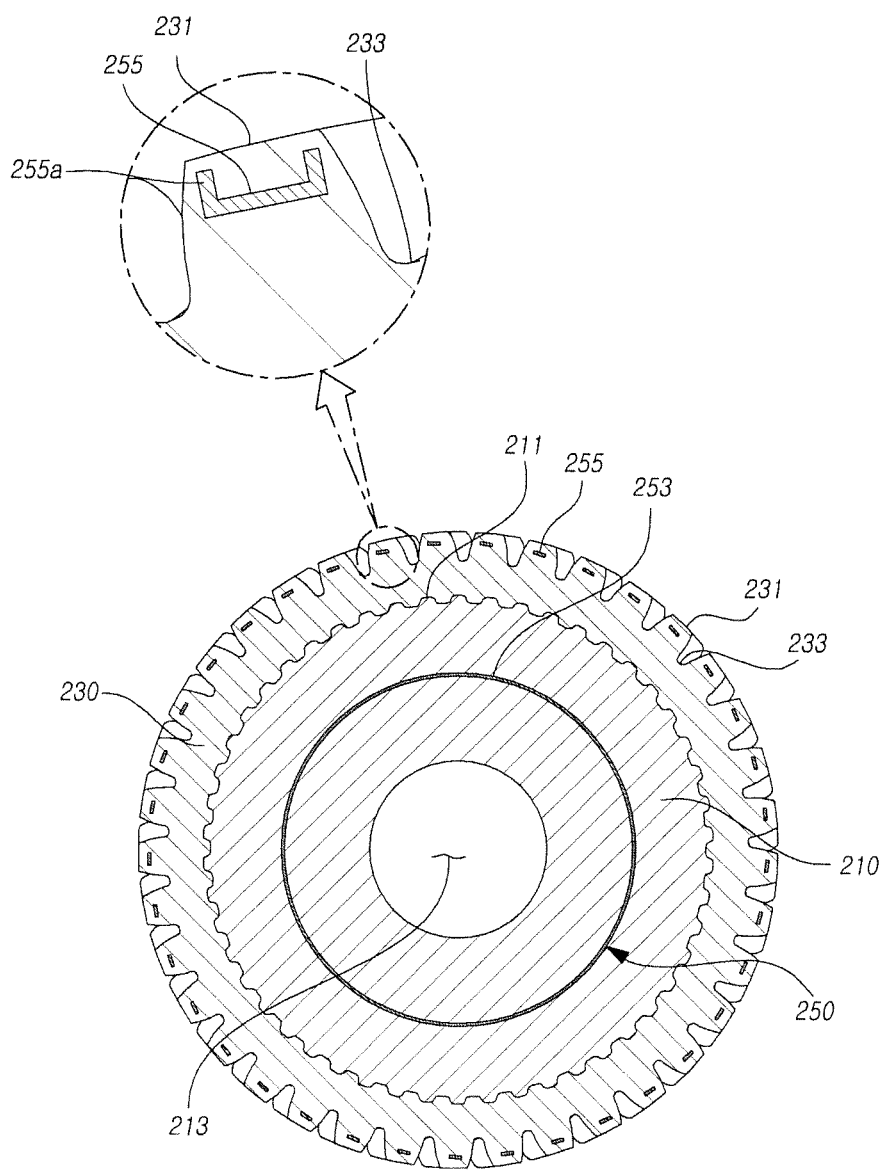
FIGS. 4A and 4B are sectional views of FIG. 3.
Figure 4B:
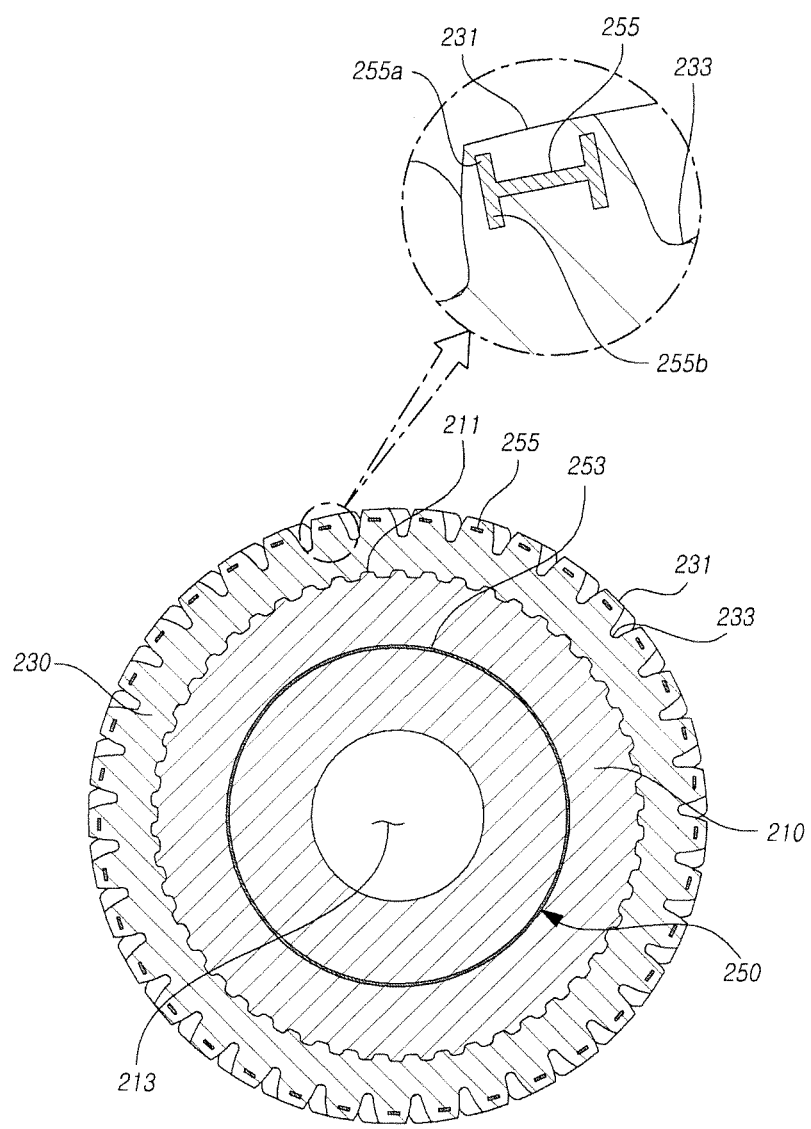
Figure 5A:
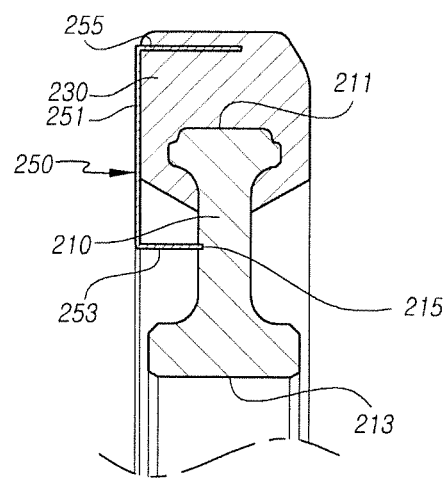
FIGS. 5A, 5B, 5C, and 5D are views illustrating a portion of the sectional view of FIG. 3.
Figure 6:
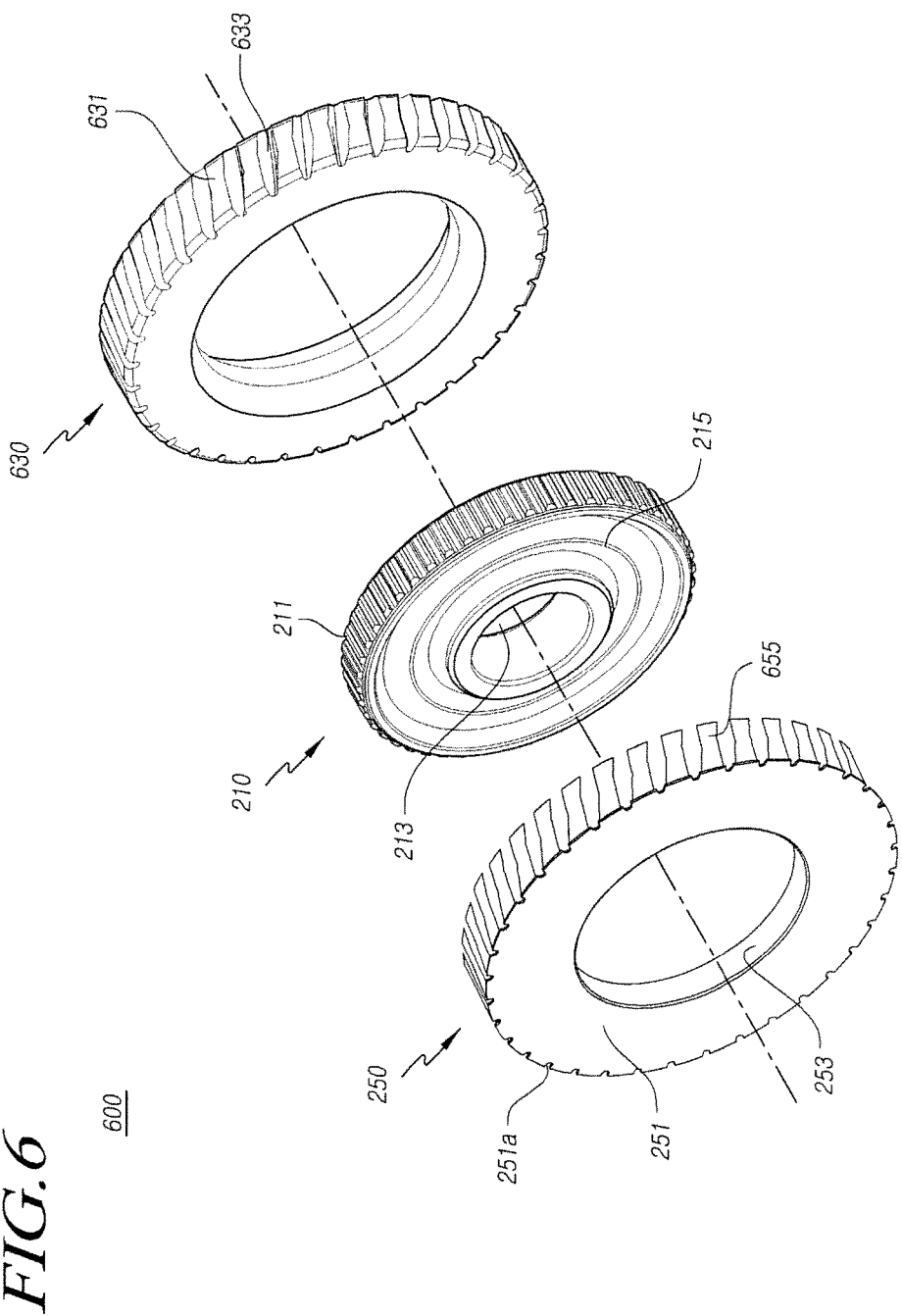
FIG. 6 is an exploded perspective view of a worm wheel of a speed reducer for a vehicle according to another embodiment of the present invention.
Figure 7:
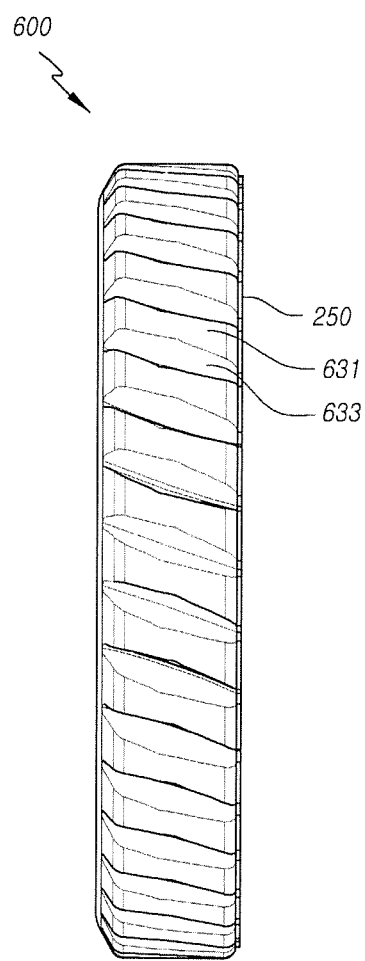
FIG. 7 is a side view of the worm wheel of the speed reducer for a vehicle according to the other embodiment of the present invention.

FIG. 2 is an exploded perspective view of a worm wheel of a speed reducer for a vehicle according to one embodiment of the present invention. FIG. 3 is a side view of the worm wheel of the speed reducer for a vehicle according to the embodiment of the present invention. FIGS. 4A and 4B are sectional views of FIG. 3. FIGS. 5A, 5B, 5C, and 5D are views illustrating a portion of the sectional view of FIG. 3. FIG. 6 is an exploded perspective view of a worm wheel of a speed reducer for a vehicle according to another embodiment of the present invention. FIG. 7 is a side view of the worm wheel of the speed reducer for a vehicle according to the other embodiment of the present invention.

As illustrated in FIG. 1 and these drawings, in the speed reducer for an electric power steering system, according to the embodiment of the present invention, the speed reducer including a worm (see 102 of FIG. 1) and the worm wheel 200, the worm wheel 200 includes a boss 210 having an empty space into which a steering shaft (see 112 of FIG. 1) is inserted, a gear part 230 integrally formed with the outer circumferential surface of the boss 210 and having crests 231 and roots 233 formed on the outer circumferential surface thereof so as to be engaged with the worm 102, and a heat conduction member 250 provided on the side of the boss 210 and the gear part 230 to support the roots 233 and the boss 210 to conduct frictional heat generated in the gear part 230 to the boss 210.

The speed reducer transmits a steering force to the steering shaft 112 through a worm shaft (see 104 of FIG. 1) rotating by the driving force of a motor (see 110 of FIG. 1) and the worm wheel 200 and decreases or increases speed according to the gear ratio of the worm 102 and worm wheel 200.

Furthermore, the worm 102 is formed on the worm shaft 104 made of metal, and the worm wheel 200 is provided at one side of the worm 102 so as to be engaged with the worm 102 formed on the outer circumferential surface of the worm shaft 104.

The speed reducer rotates the steering shaft 112 by the driving force of the motor 110 to assist with a driver's steering force while the worm shaft 104 and the worm wheel 200 operate in conjunction with each other.

Worm shaft bearings (see 106 of FIG. 1) are mounted on opposite ends of the worm shaft 104, which operates in conjunction with a motor shaft (see 108 of FIG. 1) when the motor 110 is driven, to support the rotation of the worm shaft 104.

Further, the worm wheel 200 and the worm shaft 104, which operate in conjunction with the steering shaft 112, are embedded in a gear housing (see 116 of FIG. 1).

Meanwhile, the steering shaft 112, which transmits the rotational force of a steering wheel to a rack bar when the driver operates the steering wheel, may be connected between the steering wheel and a gear box having a rack and pinion gear therein via a column and a universal joint, and the speed reducer may be coupled to the column and the steering shaft (or pinion) embedded in the gear box.

Accordingly, when the worm shaft 104 rotates by driving the motor 110, the worm wheel 200 rotates while operating in conjunction with the worm shaft 104, and at this time, the worm wheel 220 is coupled to the steering shaft 112 of the column or the steering shaft 112 of the gear box to assist with the driver's steering force.

Here, the worm wheel 200 includes the boss 210 to which the steering shaft 112 is coupled, the gear part 230 integrally formed with the outer circumferential surface of the boss 210 and engaged with the worm 102, and the heat conduction member 250 that conducts frictional heat of the gear part 230 to the boss 210.

The boss 210 has a hollow shape with an insertion hole 213 into which the steering shaft is inserted, and the gear part 230 is integrally formed with the outer circumferential surface of the boss 210.

In addition, the boss 210 has a plurality of stoppers 211 formed on the outer circumferential surface thereof and circumferentially spaced apart from each other such that the boss 210 rotates together with the gear part 230, thereby preventing the gear part 230 from spinning with no traction.

The gear part 230 is formed of a resin composite (such as plastic, etc.). The gear part 230 is integrally formed with the outer circumferential surface of the boss 210 through injection molding and has the crests 231 and the roots 233 formed on the outer circumferential surface thereof such that the gear part 230 is engaged with the worm 102.

Since the worm wheel 200 is made of an insulating material, frictional heat is generated when the rotational force of the worm shaft 104 generated by the driving of the motor 110 is transmitted to the worm wheel 200.

The frictional heat is conducted to the surroundings of the worm wheel 200 at a very low speed so that the inner temperature of the worm wheel 200 increases. Accordingly, the present invention includes the heat conduction member 250 in order to radiate the heat of the worm wheel 200 and to prevent the crests 231 and the roots 233 of the worm wheel 200 from expanding.

The heat conduction member 250 is provided on the side of the boss 210 and the gear part 230 to support the roots 233 and the boss 210 and to conduct the frictional heat generated in the roots 233 to the boss 210.

The heat conduction member 250 may be formed of a material with high thermal conductivity, such as copper, iron, etc.

In contrast, the worm wheel 200 is formed of a resin material, such as plastic, etc. As a result, the frictional heat generated in the roots 233 resides therein without being transferred to the boss 210. However, the heat conduction member 250 made of a material with high thermal conductivity very rapidly transfers the frictional heat generated in the roots 233 to the boss 210.

The heat conduction member 250 is formed in a plate shape having an empty space therein and is integrally provided on one side surface of the worm wheel 200.

Furthermore, the heat conduction member 250 includes a connecting part 251 supported on the side of the boss 210 and the gear part 230 and a boss support part 253 protruding from the inner end of the connecting part 251 in the axial direction of the steering shaft 112 so as to be supported on the boss 210, and the heat conduction member 250 supports the roots 233 of the gear part 230 and the boss 210 to conduct the frictional heat.

The connecting part 251 is formed in a plate shape having an empty space therein. The connecting part 251 is formed to cover one side surface of the worm wheel 200 to support the ends of the roots 233 and to conduct the frictional heat of the roots 233 of the worm wheel 200 to the boss 210.

Furthermore, the diameter of the connecting part 251 is smaller than that of the crests 231 of the gear part 230 and is larger than that of the roots 233 of the gear part 230.

Moreover, coupling recesses 251a having a shape corresponding to that of the roots 233 of the gear part 230 are formed in the outer peripheral portion of the connecting part 251. The coupling recesses 251a are formed in the positions corresponding to the roots 233 of the gear part 230 so as to be circumferentially spaced apart from each other.

The coupling recesses 251a support the side surfaces of the portions in which the roots 233 are formed on the side surface of the gear part 230 such that the ends of the roots 233 make contact with the connecting part 251. Accordingly, the frictional heat caused by friction between the worm 102 and the worm wheel 200 is conducted to the heat conduction member 250, and the conducted heat is conducted to the boss 210, thereby dissipating the frictional heat.

In other words, the frictional heat between the worm shaft 104 and the worm wheel 200 is generated by friction between the worm 102 of the worm shaft 104 and the roots 233 of the worm wheel 200, and the outer end of the connecting part 251 and the coupling recesses 251a make contact with the positions close to the roots 233. Accordingly, the frictional heat residing in the worm wheel 200 is conducted to the heat conduction member 250, and the heat conduction member 250 radiates the frictional heat to the boss 210.

The boss support part 253 protrudes from the inner end of the connecting part 251 in the axial direction of the steering shaft 112 to support the boss 210, and the frictional heat generated in the roots 233 by contact between the boss support part 253 and the boss 210 is conducted to the boss 210 via the connecting part 251 and the boss support part 253.

Embodiments in which the boss support part 253 supports the boss 210 are illustrated in FIGS. 5A, 5B, 5C, and 5D.

First, the boss support part 253 may be inserted into, and supported by, the boss 210. As illustrated in FIG. 5A, the boss 210 has a groove 215 concavely formed in the side surface thereof on which the heat conduction member 250 is provided, and the end of the boss support part 253 may be inserted into, and supported by, the groove 215.

In this case, the gear part 230 is injection-molded while the boss support part 253 of the heat conduction member 250 is coupled to the groove 215 of the boss 210 such that the boss 210, the heat conduction member 250, and the gear part 230 are integrally formed with each other.

Figure 5B:
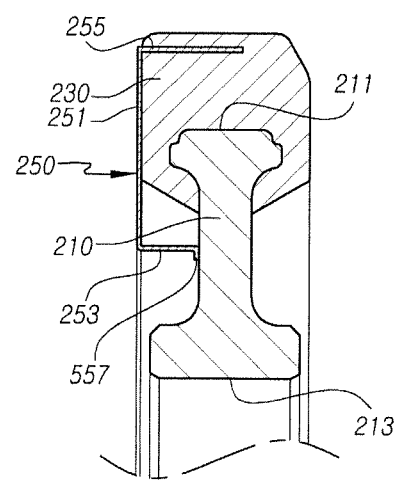

Furthermore, as illustrated in FIG. 5B, the boss support part 253 has a bent portion 557 inwardly or outwardly bent in the radial direction of the worm wheel 200 such that the boss support part 253 makes contact with the boss 210.

The bent portion 557 is supported by the boss 210 so that the frictional heat generated in the roots 233 may be conducted to the boss 210.

The bent portion 557 may also be formed by making the end of the boss support part 253 collide with the side surface of the boss 210 on which the heat conduction member 250 is provided such that the end of the boss support part 253 is bent, and the bent portion 557 transfers the frictional heat through contact with the boss 210.

Figure 5C:
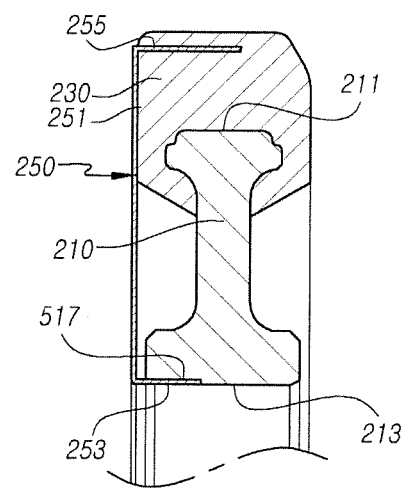

Moreover, as illustrated in FIG. 5C, the boss support part 253 may be positioned on the inner circumferential surface of the insertion hole 213 to support the boss 210.

The insertion hole 213 has a positioning section 517 concavely formed therein, and the boss support part 253 is supported by the positioning section 517 to conduct the frictional heat generated in the roots 233 to the boss 210.

In this case, the steering shaft 112 is inserted into the boss support part 253 such that the boss support part 253 simultaneously makes contact with the boss 210 and the steering shaft 112 to radiate the frictional heat to the boss 210 and the steering shaft 112.

Figure 5D:
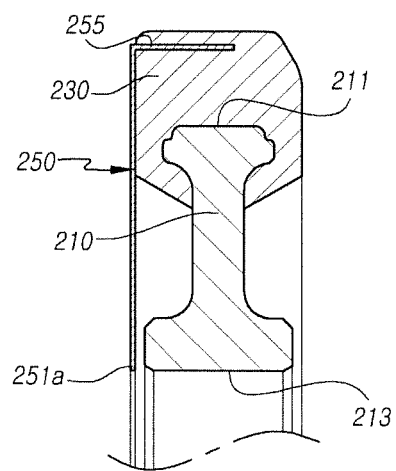

Also, as illustrated in FIG. 5D, the heat conduction member 250 is formed in a plate shape having an empty space therein, and supports the ends of the roots 233 at the outer end thereof and makes contact with the outer circumferential surface of the steering shaft 112 at the inner end thereof to conduct the frictional heat generated in the roots 233 to the steering shaft 112.

The heat conduction member 250 has a contact end 251a that protrudes inwardly from the inner end thereof in the radial direction of the worm wheel 200 to make contact with the outer circumferential surface of the steering shaft 112.

The contact end 251a protrudes to the insertion hole 213 of the boss 210 or to the vicinity of the insertion hole 213 to make contact with the outer circumferential surface of the steering shaft 112 to conduct the frictional heat generated in the roots 233 of the worm wheel 200 to the steering shaft 112.

The heat conduction member 250 has gear support parts 255 that protrude from the outer end thereof in the axial direction of the steering shaft 112 and are embedded in the crests 231.

The gear support parts 255 may be formed at the outer end of the heat conduction member 250 and may be circumferentially spaced apart from each other.

Accordingly, the heat conduction member 250 effectively conducts the frictional heat generated in the roots 233 of the worm wheel 200 to the steering shaft 112 through the plurality of gear support parts 255 and the contact end 251a.

While the heat conduction member 250 is illustrated in the drawings as being provided on one side surface of the worm wheel 200, the heat conduction member 250 may also be provided on opposite side surfaces of the worm wheel 200.

Further, the heat conduction member 250 may have the plurality of gear support parts 255 protruding from the outer end of the connecting part 251 in the axial direction of the steering shaft 112 such that the heat conduction member 250 is provided on the crests 231 to effectively radiate the frictional heat of the roots 233.

The gear support parts 255 may be embedded in the crests 231 according to injection molding of the gear part 230 so as to be provided in positions closer to the roots 233.

In this case, the gear support parts 255 do not protrude from the roots 233 so that the gear support parts 255 do not interfere with the worm 102, and the worm wheel 200 and the worm 102 are stably engaged with each other.

The gear support parts 255 are circumferentially spaced apart from each other with an equal interval therebetween and are provided in the positions corresponding to the crests 231. The gear support parts 255 are formed in a shape having a uniform width to correspond to the shape of the crests 231.

Referring to the enlarged views of FIGS. 4A and 4B, each gear support part 255 has ribs 255a and 255b that are formed thereon to be located closer to the crest 233 of the worm wheel 200 to effectively radiate the heat of the crest 233.

Referring to FIG. 4A, the gear support part 255 has the ribs 255a protruding outwardly from the opposite circumferential ends thereof in the radial direction of the worm wheel 200, and the ribs 255a may more effectively radiate the heat generated from the roots 233.

In other words, when the ribs 255a are formed on the opposite circumferential ends of the gear support part 255, the areas of the opposite ends of the gear support part 255 that are located closest to the crest 233 increase so that the ribs 255a more easily absorb the heat of the root 233 and more rapidly radiate the heat to the boss 210 or the steering shaft 211.

Referring to FIG. 4B, the gear support part 255 has the ribs 255a and 255b protruding inwardly and outwardly from the opposite circumferential ends thereof in the radial direction of the worm wheel 200.

The gear support part 255 has the ribs 255a protruding outwardly in the radial direction of the worm wheel 200 and the ribs 255b protruding inwardly in the radial direction of the worm wheel 200.

When the gear support part 255 has the ribs 255a and 255b formed thereon, the areas of the opposite ends of the gear support part 255 that are located close to the root 233 of the worm wheel 200 increase so that the contact area becomes larger and it is possible to more effectively radiate the heat generated from the crest 233.

Furthermore, as illustrated in FIGS. 6 and 7, in order to increase the area by which a worm 102 and a worm wheel 600 are engaged with each other, the worm wheel 600 has a gear tooth form in which opposite sides of each crest 631 at which the crest 631 is connected with roots 633 are concavely formed such that the worm wheel 600 makes contact with the worm 102 through curved surfaces. Accordingly, gear support parts 655 are also formed to have a width that decreases and then increases again.

The gear support parts 655 have a shape corresponding to that of the crests 631 and are provided closer to the roots 633 from which frictional heat is generated so that it is possible to prevent the crests 631 and the roots 633 from expanding by the frictional heat generated from the roots 633.

In a case where the crests 631 and the roots 633 of the worm wheel 600 are obliquely formed, the gear support parts 655 are also provided to be inclined to a connecting part 251. Although not illustrated in the drawings, when the crests 631 and the roots 633 of the worm wheel 600 are formed parallel to the axial direction of a steering shaft 112, the gear support parts 655 are also provided parallel to the axial direction of the steering shaft 112.

According to the embodiments of the present invention having the shapes and structures mentioned above, the frictional heat generated when the worm wheel is rotated by the rotational force of the worm shaft caused by driving the motor can be conducted to the boss to decrease the temperature of the worm wheel, thereby preventing the expansion of the worm wheel and enabling the worm and the worm wheel to be normally engaged with each other to prevent power loss and to stably provide a steering assist force for a driver.

In addition, by decreasing the temperature of the worm wheel by conducting the frictional heat between the worm and the worm wheel to the boss, it is possible to enhance the durability of the worm wheel and to prevent noise when transmitting a rotational force from the worm shaft to the worm wheel, thereby making a driver feel comfortable.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | |
| --- | --- |
| 200: Worm wheel | 210: Boss |
| 211: Stopper | 213: Insertion hole |
| 215: Groove | 230: Gear part |
| 231: Crest | 233: Root |
| 250: Heat conduction member | 251: Connecting part |
| 251a: Coupling recess | 253: Boss support part |
| 255: Gear support part | 517: Positioning section |

What is claimed is:

1. A speed reducer for a vehicle, the speed reducer comprising a worm and a worm wheel,
   wherein the worm wheel comprises:
   a boss having an empty space into which a steering shaft is inserted;
   a gear part integrally formed with an outer circumferential surface of the boss and having crests and roots formed on an outer circumferential surface of the gear part thereof so as to be engaged with the worm; and a heat conduction member provided on one side of the boss and the gear part to support the roots and the boss to conduct, to the boss, frictional heat generated from the gear part, wherein the heat conduction member includes a plurality of gear support parts protruding from an outer peripheral portion of the heat conduction member at a tilt angle with respect to an axial axis of the steering shaft wherein each crest of the gear part has opposite concave sides at which the crest is connected with the roots on opposite sides thereof, and each gear support part has a width that decreases and then increases again.

2. The speed reducer of claim 1, wherein the heat conduction member comprises a connecting part formed in a plate shape having an empty space therein and supporting ends of the roots at an outer end thereof, and a boss support part protruding from an inner end of the connecting part in an axial direction of the steering shaft and supported on the boss.

3. The speed reducer of claim 2, wherein a plurality of coupling recesses are formed in an outer peripheral portion of the connecting part to correspond to the roots, the coupling recesses being circumferentially spaced apart from each other.

4. The speed reducer of claim 2, wherein the heat conduction member has a the plurality of gear support parts protruding protrude from an outer end of the connecting part in the axial direction of the steering shaft, the plurality of gear support parts being provided in the crests and circumferentially spaced apart from each other.

5. The speed reducer of claim 1, wherein the plurality of gear support parts have a constant width.

6. The speed reducer of claim 1, wherein each gear support part has ribs protruding outwardly from opposite circumferential ends thereof in a radial direction of the worm wheel such that the heat conduction member effectively radiates heat generated from portions engaged with the worm shaft of and the worm wheel.

7. The speed reducer of claim 1, wherein each gear support part has ribs protruding outwardly and inwardly from opposite circumferential ends thereof in a radial direction of the worm wheel such that the heat conduction member effectively radiates heat generated from portions engaged with the worm shaft of and the worm wheel.

8. The speed reducer of claim 2, wherein a groove is concavely formed in a side surface of the boss on which the heat conduction member is supported, and an end of the boss support part is inserted into, and supported by, the groove.

9. The speed reducer of claim 2, wherein the boss support part has a bent portion formed at one end thereof to support a side surface of the boss.

10. The speed reducer of claim 2, wherein the boss support part is supported by a positioning section concavely formed in an insertion hole into which the steering shaft is inserted.

11. The speed reducer of claim 1, wherein the heat conduction member is formed in a plate shape having an empty space therein, an outer end of the heat conduction member supports ends of the roots at the outer end thereof, and an inner end of the heat conduction member makes contact with an outer circumferential surface of the steering shaft at the inner end thereof.

12. The speed reducer of claim 11, wherein the heat conduction member has a plurality of gear support parts protruding from the outer end thereof in the axial direction of the steering shaft, the plurality of gear support parts being are provided in the crests and circumferentially spaced apart from each other.

13. The speed reducer of claim 1, wherein the boss has a plurality of stoppers formed on the outer circumferential surface thereof and circumferentially spaced apart from each other to prevent the gear part from spinning with no traction.

14. The speed reducer of claim 1, wherein each crest of the gear part has opposite concave sides at which the crest is connected with the roots on opposite sides thereof, and each gear support part has a width that varies.

15. The speed reducer of claim 1, wherein each gear support part has ribs protruding outwardly or inwardly from opposite circumferential ends thereof in a radial direction of the worm wheel such that the heat conduction member effectively radiates heat generated from portions engaged with the worm and the worm wheel.

* * * * *